United States Patent [19]

Sotom et al.

[11] Patent Number: 5,796,501
[45] Date of Patent: Aug. 18, 1998

[54] WAVELENGTH DIVISION MULTIPLEXING OPTICAL COMMUNICATION NETWORK

[75] Inventors: Michel Sotom; Francesco Masetti. both of Paris; Dominique De Bouard. Ste Genevieve Des Bois; Jean-Michel Gabriagues. Asnieres; Dominique Chiaroni. Antony, all of France

[73] Assignee: Alcatel N.V., Rijswij, Netherlands

[21] Appl. No.: 678,266

[22] Filed: Jul. 11, 1996

[30] Foreign Application Priority Data

Jul. 12, 1995 [FR] France .................. 95 08437

[51] Int. Cl.$^6$ .............. H04B 10/20; H04J 14/00; H04J 14/02
[52] U.S. Cl. .............. 359/119; 359/123; 359/158; 359/125
[58] Field of Search .............. 359/118–119, 123, 359/125, 127, 158, 165–167; 370/436

[56] References Cited

U.S. PATENT DOCUMENTS

| | | | |
|---|---|---|---|
| 5,289,302 | 2/1994 | Eda | 359/123 |
| 5,365,344 | 11/1994 | Eda et al. | 359/124 |
| 5,369,515 | 11/1994 | Majima | 359/125 |
| 5,548,431 | 8/1996 | Shin et al. | 359/119 |
| 5,576,875 | 11/1996 | Chawki et al. | 359/125 |

FOREIGN PATENT DOCUMENTS

| | | |
|---|---|---|
| 0497667A1 | 8/1992 | European Pat. Off. . |
| 0544216A1 | 6/1993 | European Pat. Off. . |
| 0621700A3 | 10/1994 | European Pat. Off. . |
| 63-272132 | 11/1988 | Japan . |

Primary Examiner—Kinfe-Michael Negash
Attorney, Agent, or Firm—Sughrue, Mion, Zinn, Macpeak & Seas, PLLC

[57] ABSTRACT

To simplify the connection protocols of an optical communication network using wavelength division multiplexing and to increase the throughput of the network, each node sends messages on a specific wavelength and associates destination labels with them. A network controller receives the messages and the labels and forwards the messages on the receive wavelength of their destination node(s). Applications include local area networks.

7 Claims, 5 Drawing Sheets

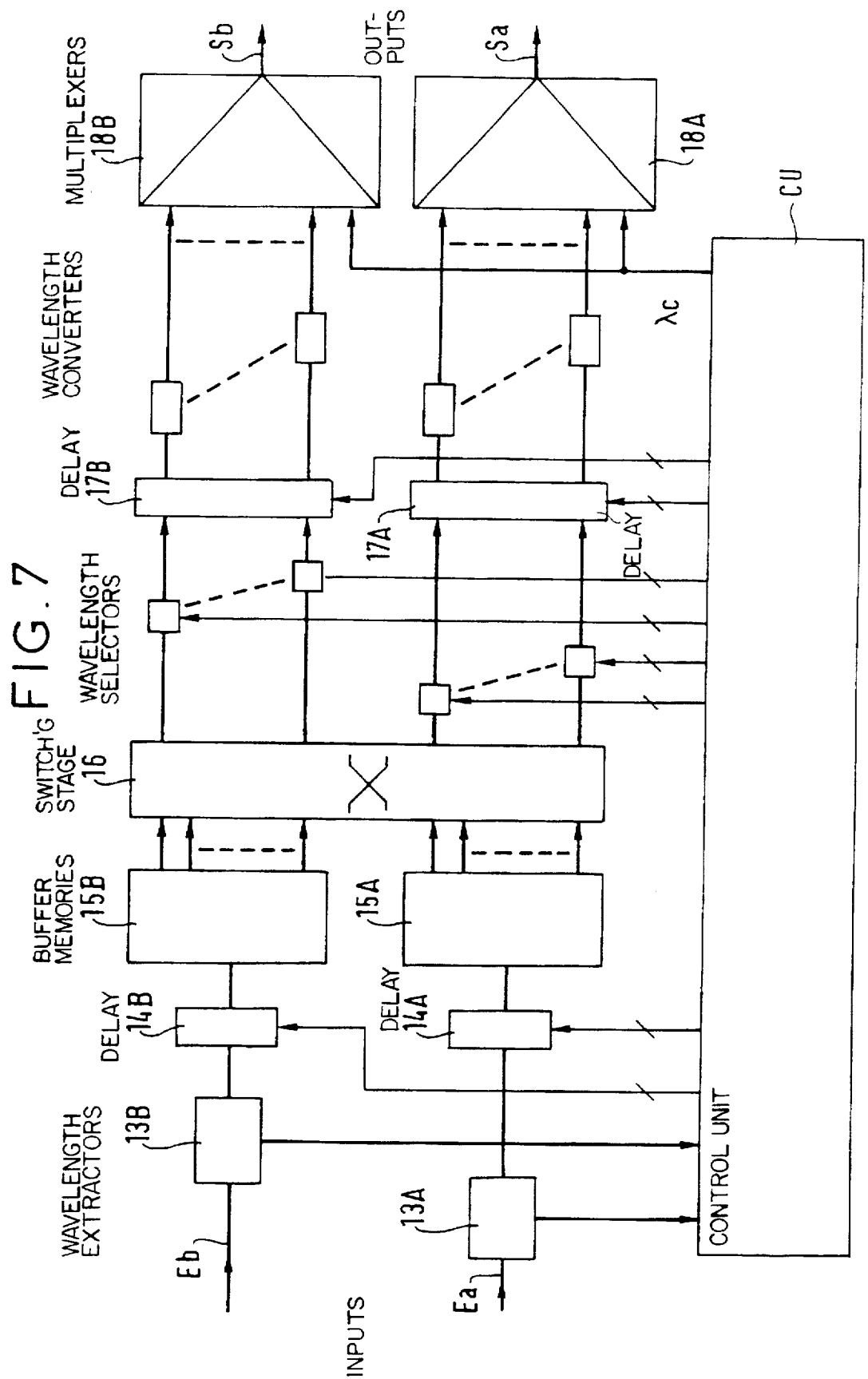

WAVELENGTH DIVISION MULTIPLEXING OPTICAL COMMUNICATION NETWORK

BACKGROUND OF THE INVENTION

1. Field of the Invention

The invention is in the field of data communications using optical links to convey wavelength multiplexed signals. It is more particularly concerned with a network architecture particularly suitable for limited geographical areas, such as local area networks. The invention also concerns a switching matrix that can be used in a controller suitable for a network of this kind.

An object of the invention is to design a network capable of supporting uniform or sporadic traffic and bit rates up to a few Gigabits per second and that does not require a complex call set-up protocol.

2. Description of the Prior Art

A network comprises a plurality of stations able to send and to receive messages to and from other stations of the network. Data is exchanged by means of a communication link to which communication nodes associated with the stations are connected. In the case of optical links using optical fibers, for example, their wide bandwidth is exploited to use wavelength multiplexing. Each station or node of the network can be assigned a particular wavelength to convey messages addressed to that node, for example. Each node connected to the optical link sends a message to a destination node by modulating an optical wave having a wavelength associated with the destination node. Each node can receive a message by detecting its associated wavelength.

This solution has various drawbacks, however. Firstly, each node must be able to send each of the wavelengths of the other nodes of the network. It is also necessary to solve problems of collision, i.e. situations in which there is a risk of more than one node sending messages to the same destination. One way to solve this problem is to provide an additional wavelength carrying a synchronization signal and an indication of the occupancy of each wavelength, for example. Each node must then use an access protocol that allows for the occupancy of the destination wavelength. This makes protocol management more complex and limits the throughput of the network.

An object of the invention is to solve the problems raised by the above solution.

SUMMARY OF THE INVENTION

To this end, the invention consists of a data communication network using optical links and wavelength multiplexing to exchange messages between nodes constituting at least one subset of said network, wherein said messages are contained in time intervals defined by a clock signal, each node has an input connected to said link to receive messages by detecting at least one specific receive wavelength, each node has an output connected to said link enabling it to send messages by modulation of an optical wave, each node is adapted to have messages to be sent conveyed by an optical wave of a specific send wavelength and to associate therewith respective labels identifying the destination nodes of the messages, a network controller connected to said link is adapted to receive said messages and said associated labels sent by each of said nodes and to forward said messages received to the inputs of said nodes, said forwarded messages are conveyed by wavelengths respectively corresponding to the receive wavelengths of the destination nodes identified by the labels respectively associated with said messages, and said send wavelength of each node is different from said receive wavelengths of the other nodes.

Given the dissociation of the send wavelength of each node and the receive wavelengths of the other nodes, there is no constraint at the nodes associated with collision problems. This greatly simplifies the implementation of the nodes.

With regard to the choice of send and receive wavelengths, one particularly simple solution is to assign each node the same send and receive wavelength specific to the node and different from those of the other nodes.

To improve the throughput of the network it is desirable for each node to be able to send messages and the associated labels simultaneously. To this end, and in accordance with another aspect of the invention, each node is adapted to send said labels by modulating a common control wavelength.

In accordance with a further aspect of the invention, the network controller is adapted to supply to said nodes said clock signal carried by said control wavelength and each label is in the form of modulation of said control wavelength within one of said time intervals, said modulation being dependent on the destination node(s) of the message sent during time interval.

This latter feature has the advantage that all of the routing data can be conveyed by a single wavelength.

In accordance with a further aspect of the invention, said modulations produced by said nodes are contained within non-contiguous time windows associated with the respective nodes. This has the advantage that it is not necessary to include in the label any indication of the identity of the sender, i.e. of the wavelength conveying the message addressed to the node identified by the label.

The invention further consists of a communication network the nodes of which are organized into one or more subsets each having a ring structure.

The invention finally consists of a switching matrix for use in a controller for a data communication network using optical links and exchanging messages contained in time intervals defined by a clock signal, said controller being adapted to receive and to forward wavelength multiplexed send messages, the forwarded messages being conveyed by receive wavelengths, said matrix including:

- an optical buffer memory comprising N time-delay stages adapted to store N respective successive received message multiplexes,
- a space switching stage having N inputs and n outputs connected to said buffer memory and adapted to connect each time-delay stage selectively to at least one of its outputs,
- n wavelength selectors having inputs connected to respective outputs of said space switching stage, and
- wavelength converters having inputs connected to respective outputs of said selectors.

Other aspects and advantages of the invention will emerge from the remainder of the description with reference to the drawings.

BRIEF DESCRIPTION OF THE DRAWINGS

FIG. 7 shows one embodiment of the network controller used in the FIG. 6 network.

DETAILED DESCRIPTION OF THE PREFERRED EMBODIMENTS

Figure 1:
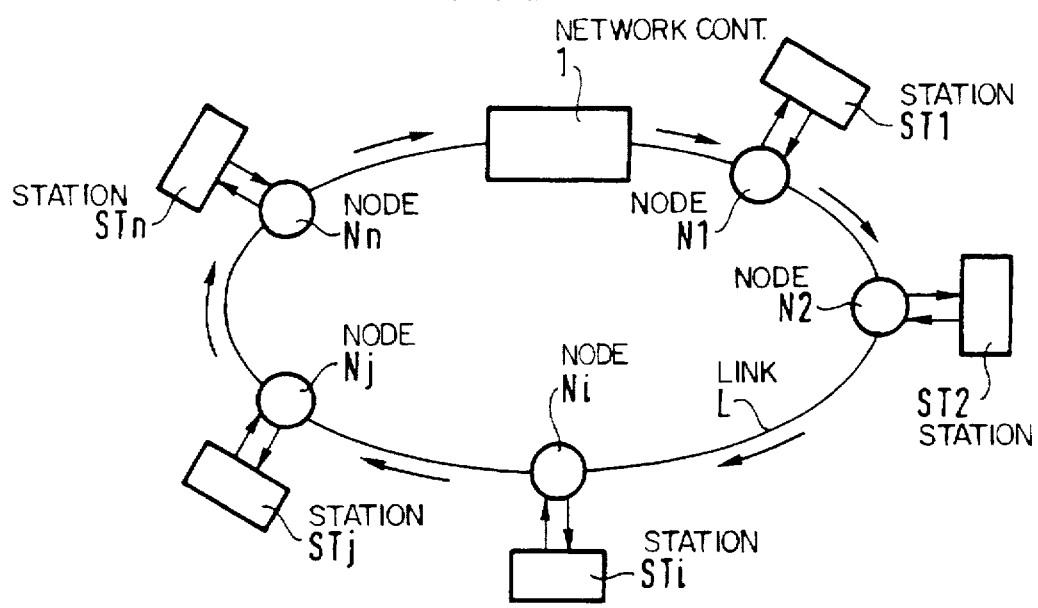
FIG. 1 is a diagram showing a network of the invention having a ring structure.

The network shown in FIG. 1 includes nodes N1, N2, Ni, Nj, Nn interconnected by an optical link L and respectively associated with stations ST1, ST2, STi, STj, STn. A network controller 1 has an output connected to the input of the first node N1 and an input connected to the output of the last node Nn. Each intermediate node Ni has its input and its output respectively connected to the output of the upstream node N2 and to the input of the downstream node Nj. Each of the nodes Ni is associated with a receive wavelength $\lambda i$ and with a send wavelength that can be equal to the receive wavelength $\lambda i$.

Figure 2:
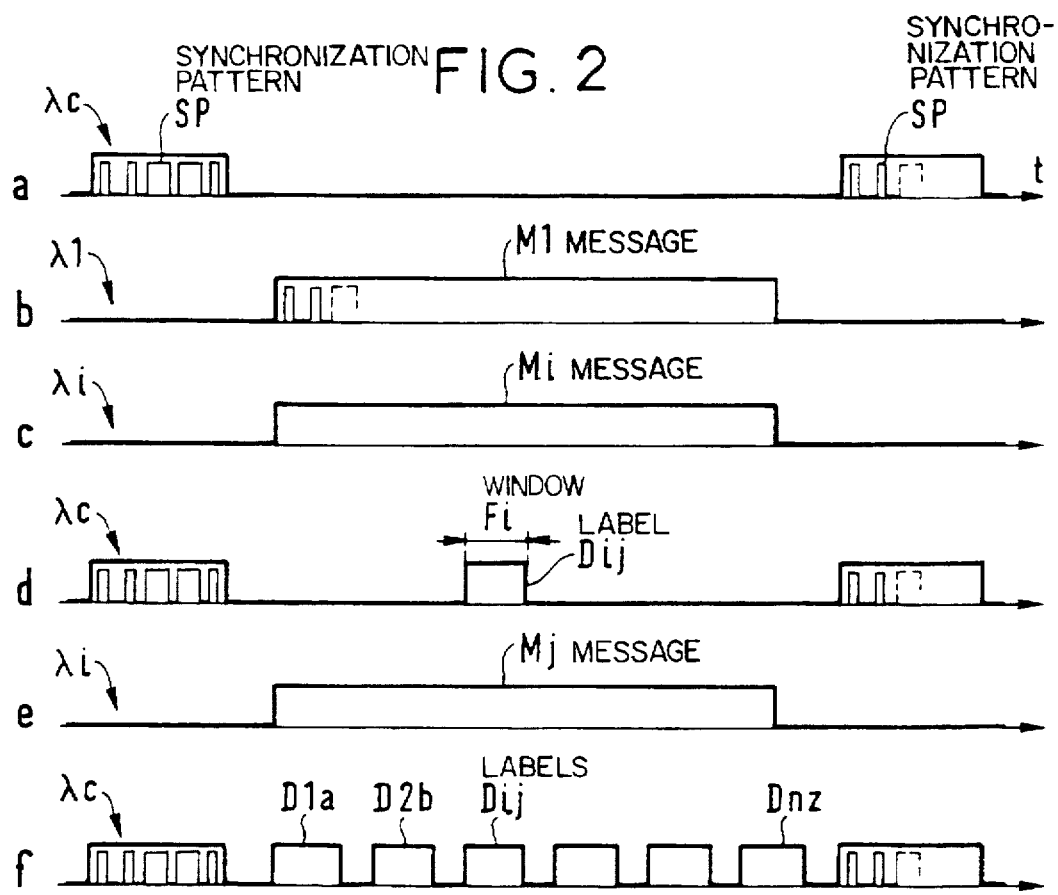
FIG. 2 shows timing diagrams explaining how the network of the invention works.

To explain the operation of the network in more detail, reference is made to the timing diagrams a through f in FIG. 2 which shows the modulations of the various signals involved. The signal sent from the output of the network controller 1 is a multiplex of optical waves of the wavelengths $\lambda 1, \ldots, \lambda i, \ldots, \lambda n$ of the nodes of the network and the control wavelength $\lambda c$. At the output of the controller 1 the control wavelength $\lambda c$ carries a clock signal having the form of a synchronization pattern SP modulating $\lambda c$ (timing diagram a). During each time interval between two successive synchronization patterns, the other wavelengths such as $\lambda 1, \lambda i$ convey messages M1, Mi respectively addressed to the node N1, Ni (timing diagrams b and c).

The multiplex sent by the controller 1 is received by the first node N1 of the network which responds to the message M1 by detecting its receive wavelength $\lambda 1$. If the station ST1 associated with the node N1 has a message to send, it inserts it into the multiplex received by correspondingly modulating its send wavelength, which can be equal to its receive wavelength. In parallel with this, the node N1 inserts on the control wavelength $\lambda c$ a label representative of the addressee(s) of the message sent. The new multiplex formed in this way is then sent to the next node N2 which carries out these same operations. More generally, as shown in the timing diagrams c, d and e, any node Ni of the network receives in this way a multiplex conveyed by the wavelengths $\lambda c, \lambda 1, \ldots, \lambda i, \ldots, \lambda n$. After detecting the clock signal SP conveyed by $\lambda c$, the node Ni responds to any message Mi addressed to it by detecting its wavelength $\lambda i$. If the station STi associated with the node Ni has a message Mj addressed to the node Nj, the node Ni places this message on its wavelength $\lambda i$, the message being contained in a time interval between two clock signals conveyed by $\lambda c$. At the same time, the node Ni inserts into the same time interval the label Dij conveyed by $\lambda c$. The label Dij is a modulation representative of the addressee(s) of the message Mj, this modulation being contained in a time window Fi reserved to the node Ni and contained in each time interval concerned.

Accordingly, the input of the network controller 1 receives messages Mj conveyed by the various wavelengths $\lambda i$ of the message senders. Similarly, it receives the control signal (timing diagram f) containing the labels D1a, D2b, Dij, Dnz representative of the addressees of the messages respectively sent by the nodes N1, N2, Ni, Nn. According to the temporal position and the content of these labels, the controller 1 can carry out wavelength conversion so that the associated messages are conveyed by the wavelength(s) of the addressees of those messages.

Figure 3:
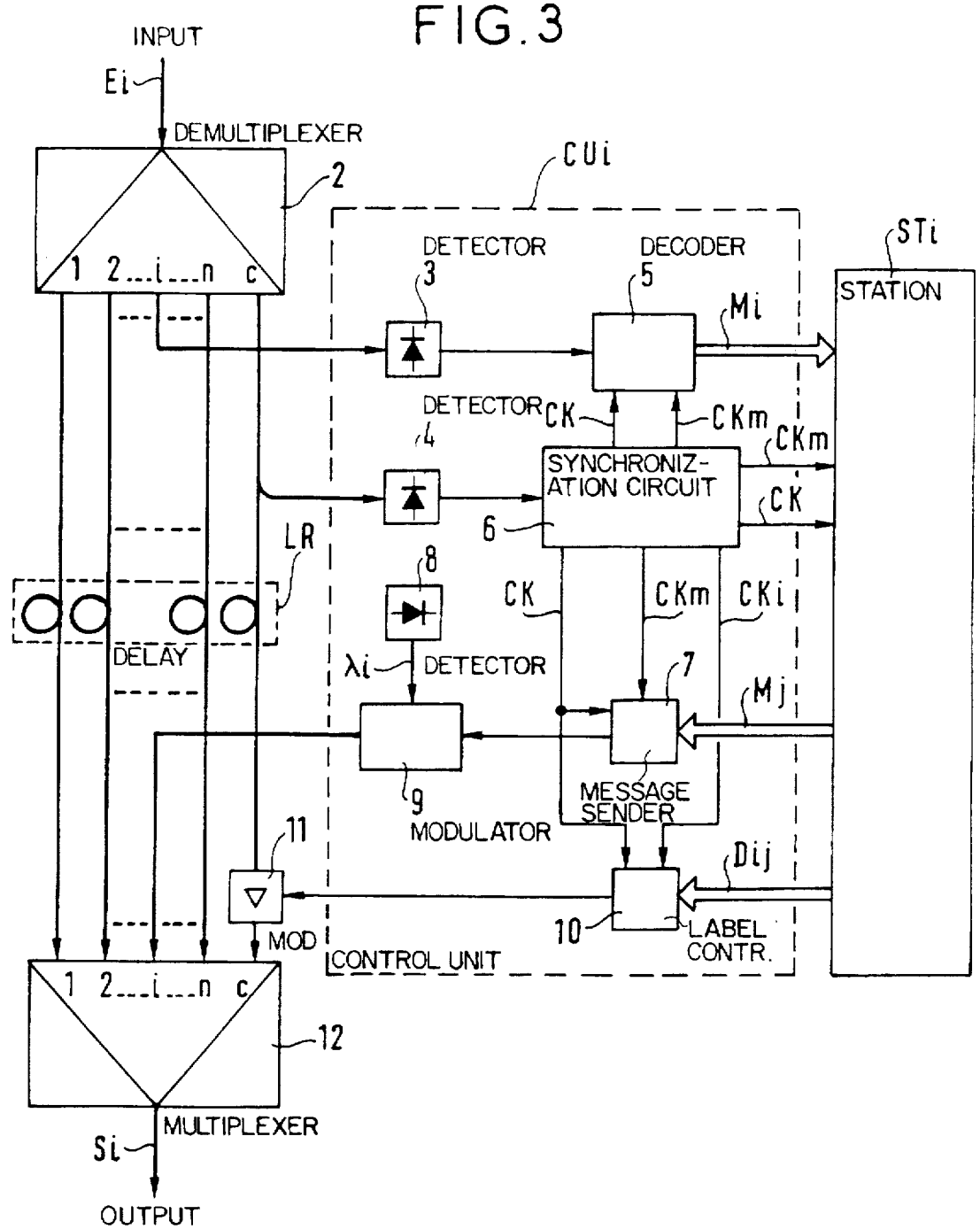
FIG. 3 shows one embodiment of the nodes of the network of the invention.

FIG. 3 shows one embodiment of one of the nodes Ni of the network. The node Ni includes wavelength extraction and insertion means in the form of a demultiplexer 2 and a multiplexer 12. The input Ei of the demultiplexer 2 that constitutes the input of the node is connected to the output of the upstream node by the optical link L. It provides at its outputs the various wavelengths of the multiplex received at the input Ei. The outputs of the demultiplexer 2 are connected by optical links to the corresponding inputs of the multiplexer 12, except for the output i corresponding to the wavelength $\lambda i$ of the node Ni. This output i is connected to a first input of a control unit CUi of the node Ni. The output c that corresponds to the control wavelength $\lambda c$ is additionally connected to a second input of the control unit CUi. The first input of the control unit CUi is the input of a detector 3 tuned to the wavelength $\lambda i$ of the node Ni. The output of the detector 3 supplies an electrical signal that is sent to a decoder 5 to form the received message Ni addressed to the associated station STi. Similarly, the second input of the unit CUi corresponds to the input of a second detector 4 tuned to the control wavelength $\lambda c$. The electrical signal supplied by the detector 4 is received by a synchronization circuit 6 designed to recognize the synchronization patterns SP conveyed by $\lambda c$ and to generate a corresponding sychronization signal CKm. The circuit 6 also recovers a primary clock signal CK by means of the modulation timing of the pattern SP. The signals CKm and CK are synchronization and clock signals for the decoder 5. The circuit 6 further supplies a window synchronization signal CKi.

The unit CUi further includes a circuit 7 for sending messages synchronized by the signals CKm and CK and which delivers a modulation control signal dependent on the messages Mj supplied by the station STi. The circuit 7 controls a modulator 9 that receives the wave from a laser source tuned to the wavelength $\lambda i$. Its output is connected to the input i of the multiplexer 12.

The unit CUi finally includes a circuit 10 controlling the sending of labels synchronized by the signals CK and CKi supplying a modulation control signal dependent on the address Dij of the addressee(s) of the message Mj to be sent. The modulation control signal is applied to a modulator 11 inserted into the link connecting the output c of the demultiplexer 2 to the corresponding input of the multiplexer 12. The optical links between the outputs of the demultiplexer 2 and the inputs of the multiplexer 12 include calibrated optical delay lines LR.

As an alternative, the node Ni could have a plurality of receive and send wavelengths. It would then suffice to provide a plurality of detectors 3, a plurality of send circuits 7 and a plurality of modulators 9.

The node shown in FIG. 3 operates in the following manner. Reception via the detector 4 of a synchronization pattern decoded by the circuit 6 enables the latter to generate the primary clock signal CK and the synchronization signal CKm. These signals enable the decoder 5 to decode the message conveyed by the wavelength $\lambda i$ and to transmit it to the station STi. If a message Mj must be sent to the address Dij, the circuit 7 applies a modulation corresponding to the message to the input i of the multiplexer 12 by means of the modulator 9 and the source 8. In parallel with this, the circuit 10 applies a modulation corresponding to the address Dij to the wavelength $\lambda c$ by means of the modulator 11. This modulation is placed in the window assigned to the node in question by means of the signal CKi.

The parameters of the delay lines LR are set so that the response times of the electronic circuits of the control unit CUi are compensated.

Figure 4:
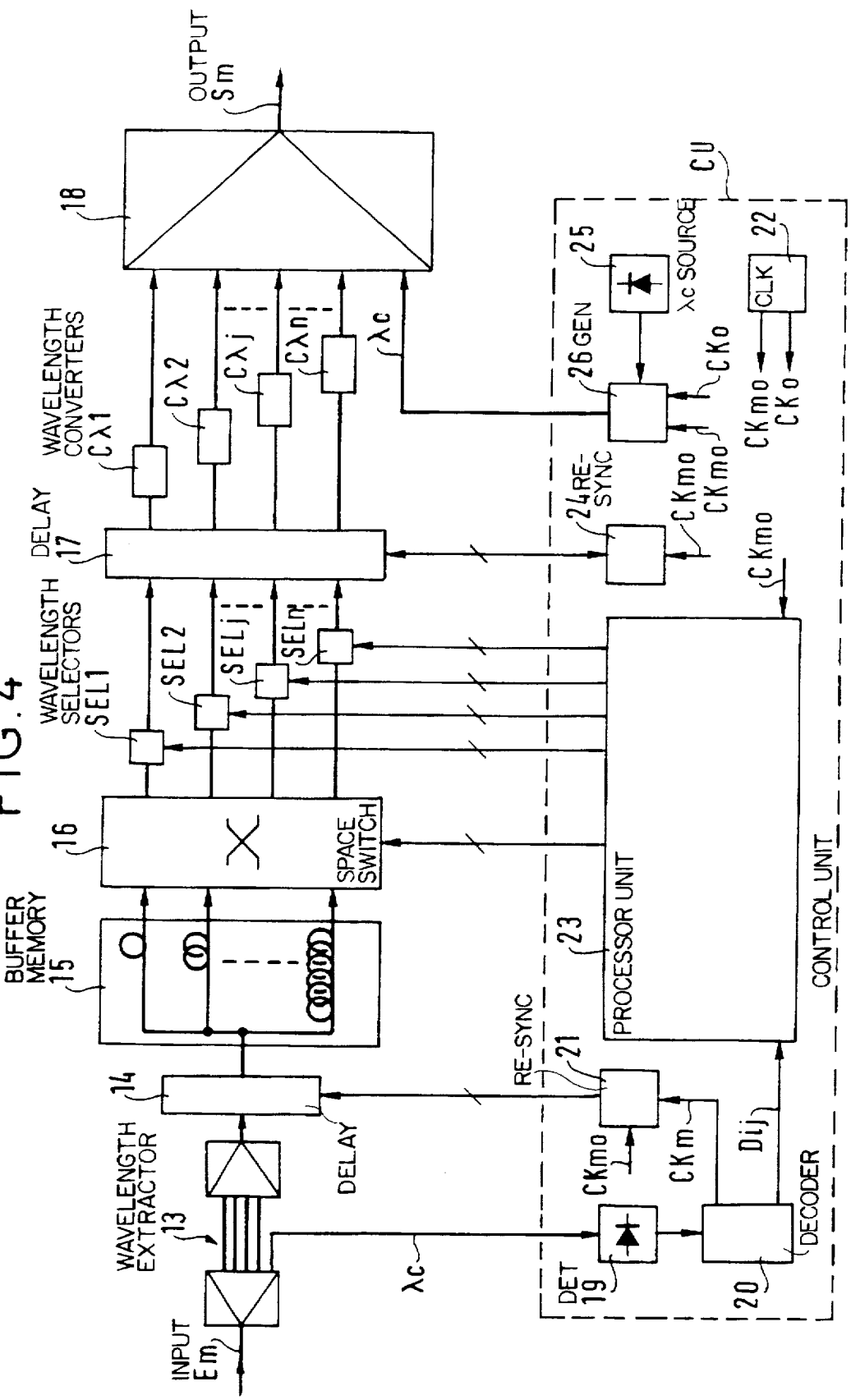
FIG. 4 shows one embodiment of the controller of the network of the invention.

FIG. 4 shows one embodiment of the network controller 1. The controller 1 includes a wavelength extractor 13 the input of which constitutes the input Em of the controller. The extractor 13 supplies the control wavelength λc to a control unit CU and the other wavelengths of the received multiplex to a first variable time-delay stage. The output of this stage 14 is connected to a space/time switching matrix comprising an optical buffer memory 15 and a space switching stage 16. The buffer memory 15 comprises N optical delay lines procuring propagation times that are successive multiples of the time interval between two successive synchronization patterns. The stage 16 includes a number n of outputs equal to the number of receive wavelengths. Each of its outputs is connected to the input of a wavelength selector SEL1, SEL2, SELj, SELn the outputs of which are connected to the inputs of a multiplexer 18 through a second variable time-delay stage 17 and wavelength converters Cλ1, Cλ2, Cλj, Cλn. The output of the multiplexer 18 constitutes the output Sm of the network controller. The multiplexer 18 has a supplementary input connected to the control unit CU to insert the control signal conveyed by λc.

Figure 5:
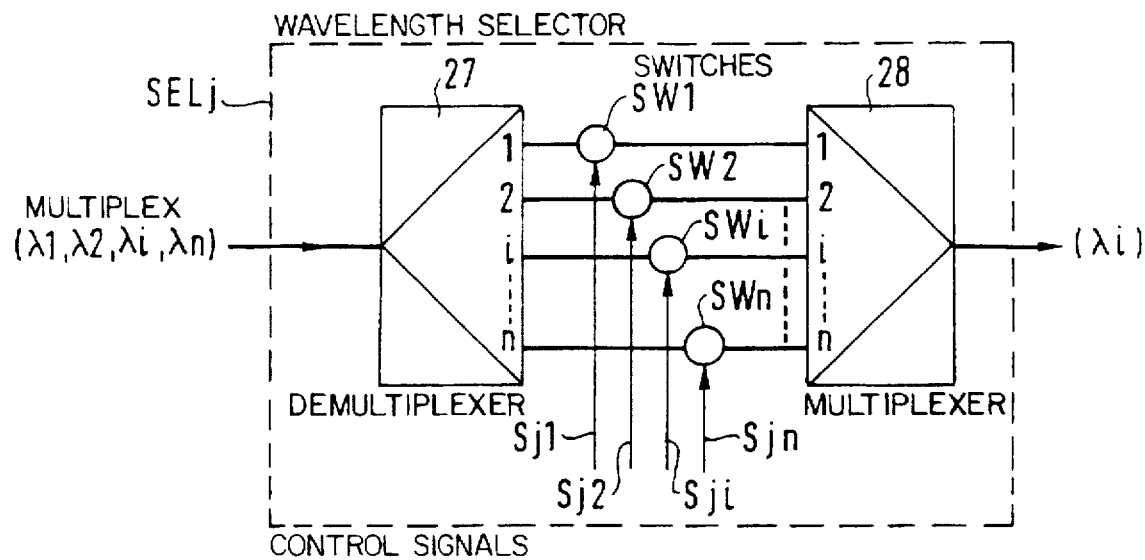
FIG. 5 shows a detailed embodiment of a wavelength selector used in the FIG. 4 diagram.

The wavelength extractor 13 may be implemented by means of a demultiplexer the output of which corresponding to the control wavelength λc is connected to the unit CU and the other outputs of which are connected to the inputs of a multiplexer. The first time-delay stage may be implemented by means of a set of delay lines made up of segments of optical fiber of different lengths associated with switching means controlled by the unit CU. The wavelength selectors SELj, etc, can be implemented as shown in FIG. 5. The selector SELj includes a demultiplexer 27 the input of which receives the multiplex λ1, λ2, λi, λn and the outputs of which are connected to the corresponding inputs of a multiplexer 28 via optical links and optical switches SW1, SW2, SWi, SWn. The switches SW1-SWn are controlled by electrical control signals Sj1-Sjn supplied by the unit CU.

The control unit CU includes a detector 19 responsive to the wavelength λc supplied by the extractor 13. The output of the detector 19 is connected to an input decoder 20 which recovers the synchronization signals CKm and decodes the successive labels Dij conveyed by λc. The synchronization signal CKm is received by a primary resynchronization circuit 21 which controls the first variable time-delay stage 14 in accordance with the phase difference between the recovered synchronization signal CKm and a reference synchronization signal CKm0 supplied by a clock circuit 22. The labels decoded by the decoder 20 are supplied to a processor unit 23 that controls the switching stage 16 and the wavelength selectors SELj. The processor unit 23 is based on a microcontroller programmed to execute a selection algorithm. The algorithm is designed to establish the correspondences between the wavelengths of the addressees of the messages and the wavelengths conveying those messages at the input of the network controller. The selection algorithm is also designed to manage conflicts, i.e. situations in which, in the same time interval, more than one message conveyed by different wavelengths have the same addressee. The processor unit controls the stage 16 and the selectors SELj through appropriate interface circuits, not shown.

One input of the multiplexer 18 is connected to the output of a synchronization pattern generator 26 connected to a source 25 of the wavelength λc and synchronized by the synchronization signal CKm0 and a primary clock signal CK0 supplied by the clock circuit 22. A secondary resynchronization circuit 24 controls the second time-delay stage 17.

The first and second time-delay stages 14 and 17 could be implemented in accordance with the teaching of "An Optical Cell Synchronizer for Packet Switched Nodes", M. BUZIO et al, published in the proceedings of the conference PHOTONICS IN SWITCHING, Salt Lake City, March 1995, pages 64 through 66.

The network controller shown in FIG. 4 operates in the following manner. The control wavelength λc extracted from the extractor 13 and detected by the detector 19 enables the input decoder 20 to produce the synchronization signal CKm and the addressee labels. The primary resynchronization circuit 21 uses the signal CKm to control the time-delay applied by the stage 14 in order to minimize the phase difference between the signal CKm and the reference synchronization signal CKm0. The processor unit 23 receiving the labels Dij determines from the position of each label in the time interval the wavelength of the sender and the wavelength conversion to be carried out to have the corresponding message conveyed at the output by the wavelength associated with the addressee of the message identified by the label. According to the conversions to be carried out and any conflicts detected, the processor unit controls the switching stage 16 to set up the appropriate connections between the outputs of the buffer memory 15 and the inputs of the wavelength selectors SELj. In parallel with this, the unit 23 controls the switches SWi of each of the wavelength selectors SELj so that each wavelength selector SELj associated with the destination node Nj supplies at the output the wavelength λi associated with the sender of the message. After secondary resynchronization by the stage 17, where necessary, each sender wavelength λi is converted to a receiver wavelength λj by the wavelength converter Cλj associated with the selector SELj. The multiplexer 18 then supplies at its output a new multiplex of the destination node wavelengths and the wavelength λc of the control signal.

Note that the structure of the switching matrix made up of the memory 15, the stage 16, the selectors SELj and the converters Cλj makes it possible to broadcast messages, i.e. to send the same message on more than one wavelength.

Figure 6:
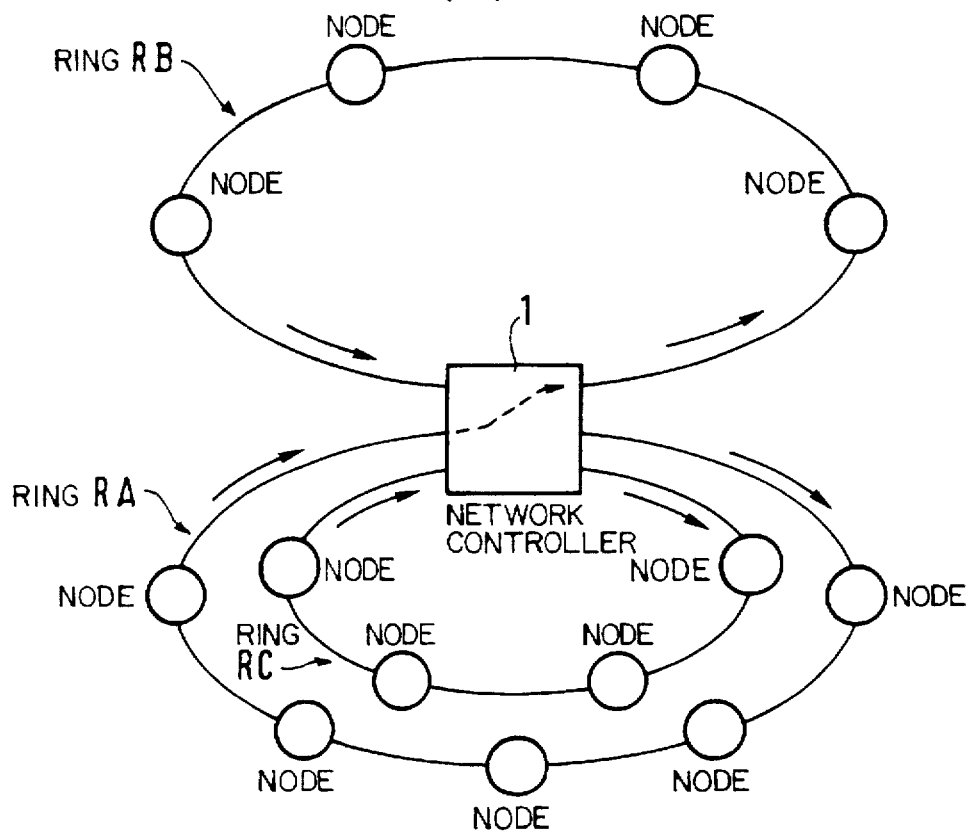
FIG. 6 is a diagram showing another network of the invention comprising a plurality of rings.

FIG. 6 shows a network in accordance with the invention and comprising a plurality of rings RA, RB, RC associated with a common network controller. Each node of the network is of similar construction to that described with reference to FIG. 3. However, it is necessary to provide in the circuit controlling the sending of labels the facility to indicate the number of the ring to which the destination node of each message belongs. The selection algorithm executed by the processor unit 23 of the network controller 1 also allows for this.

FIG. 7 shows one example of the structure of a controller 1 in the particular case where the network includes two rings RA and RB. In a similar way to the FIG. 4 embodiment, each ring is associated with a wavelength extractor 13A, 13B, a first variable time-delay stage 14A, 14B, a buffer memory 15A, 15B, a switching stage 16, selectors, secondary time-delay stages 17A, 17B, wavelength converters and multiplexers 18A, 18B the outputs Sa, Sb of which are respectively connected to the rings RA, RB.

The FIG. 7 controller operates in a similar way to the FIG. 4 controller except that the switching stage 16 can cause messages from nodes belonging to one of the rings to be transferred to a destination node belonging to the other ring.

More generally, the controller 1 could be adapted to manage any number of rings by providing the necessary corresponding stages.

There is claimed:

1. A data communication network using optical links and wavelength multiplexing to exchange messages between nodes constituting at least one subset of said network, wherein:

said messages are contained in time intervals defined by a clock signal;

each node has an input connected to one of said links to receive messages by detecting at least one specific receive wavelength;

each node has an output connected to said link enabling it to send messages by modulation of an optical wave;

each node is adapted to have messages to be sent conveyed by an optical wave of a specific send wavelength unique to said each node, and to associate therewith respective destination labels containing addresses identifying destination nodes of the messages, each message and its associated destination label being sent in a same one of said time intervals, each specific send wavelength being independent of the addressed destination;

a network controller connected to said link is adapted to receive said messages and said associated labels sent by each of said nodes and to forward said messages received to the inputs of said nodes;

said forwarded messages are conveyed by wavelengths respectively corresponding to the receive wavelengths of the destination nodes identified by the labels respectively associated with said messages; and said unique send wavelength of each node is different from said receive wavelengths of the other nodes.

2. Network according to claim 1 wherein said send wavelength and said receive wavelength of the same node are equal.

3. Network according to claim 1 wherein said nodes are adapted to send said labels by modulating a common control wavelength.

4. Network according to claim 3 wherein said network controller is adapted to supply to said nodes said clock signal conveyed by said control wavelength, each label is in the form of modulation conveyed by said control wavelength within one of said time intervals and said modulation is dependent on the destination node of the message sent during said time interval.

5. Network according to claim 4 wherein said modulation produced by each node is contained within a respective non-contiguous time window associated with said node.

6. Network according to claim 1 wherein each subset of nodes of said network has a ring structure, said network controller has an output connected to the input of a first node of said ring and an input connected to the output of a last node of said ring and each intermediate node has its input and its output respectively connected to the output of the node on its upstream side and to the input of the node on its downstream side.

7. Network according to claim 6 further comprising a plurality of subsets of nodes each having a ring structure and wherein said label associated with a message includes an indication of the ring to which each destination node of said message belongs.

* * * * *